United States Patent [19]
Murata

[11] 3,863,777
[45] Feb. 4, 1975

[54] ARTICLE STORAGE AND HANDLING SYSTEM
[75] Inventor: Tsuneo Murata, Tokyo, Japan
[73] Assignee: Tsubakimoto Chain Co., Osaka-shi, Japan
[22] Filed: July 18, 1973
[21] Appl. No.: 380,282

[30] Foreign Application Priority Data
July 19, 1972 Japan.............................. 47-72369
Oct. 18, 1972 Japan.............................. 47-10364
Oct. 23, 1972 Japan.............................. 47-105249
Nov. 15, 1972 Japan.............................. 47-113902

[52] U.S. Cl.......... 214/16 B, 214/730, 214/16.4 A, 214/750
[51] Int. Cl.............................. B65g 1/04, B66f 9/14
[58] Field of Search.............. 214/16 B, 730, 701 P, 214/16.4 A, 750, 731

[56] References Cited
UNITED STATES PATENTS
2,096,958  10/1937  Clesc.................................. 214/16 B
3,387,731   6/1968  Gibson et al..................... 214/750 X
2,628,734   2/1953  Jannsen.............................. 214/750
2,877,916   3/1959  Repke et al........................ 214/750
3,027,023   3/1962  McGrath............................ 214/16 B
3,182,837   5/1965  Farmer et al. .................. 214/750 X
3,323,664   6/1967  Loef et al. ....................... 214/750 X
3,467,264   9/1969  Armington et al................. 214/730
3,599,818   8/1971  Stanton............................ 214/730 X
3,731,824   5/1973  Howlett............................ 214/16 B FOREIGN PATENTS OR APPLICATIONS
329,460   5/1930  Great Britain....................... 214/750

Primary Examiner—Robert J. Spar
Assistant Examiner—R. B. Johnson
Attorney, Agent, or Firm—Woodhams, Blanchard & Flynn

[57] ABSTRACT

An automatic warehousing and loading-and-unloading apparatus for loading a group of pallet units arranged in a row, and each comprising fixed box-shaped objects mounted on a pallet, onto the feeding end of a number of parallel-disposed warehousing conveyors for storing in a warehouse. Each pallet group is loaded, as required, by loading means onto another conveyor for transferring to a shipping yard where two groups are combined and loaded onto a truck.

3 Claims, 15 Drawing Figures

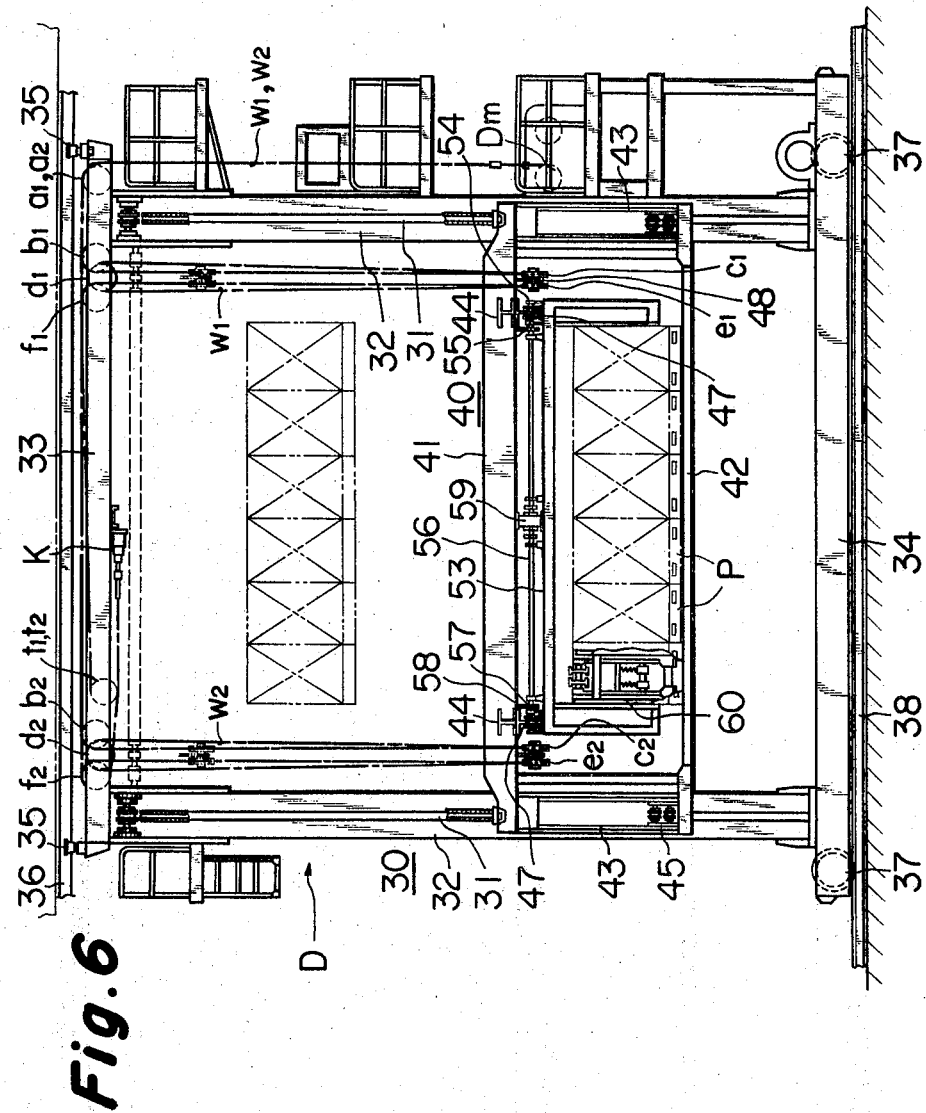

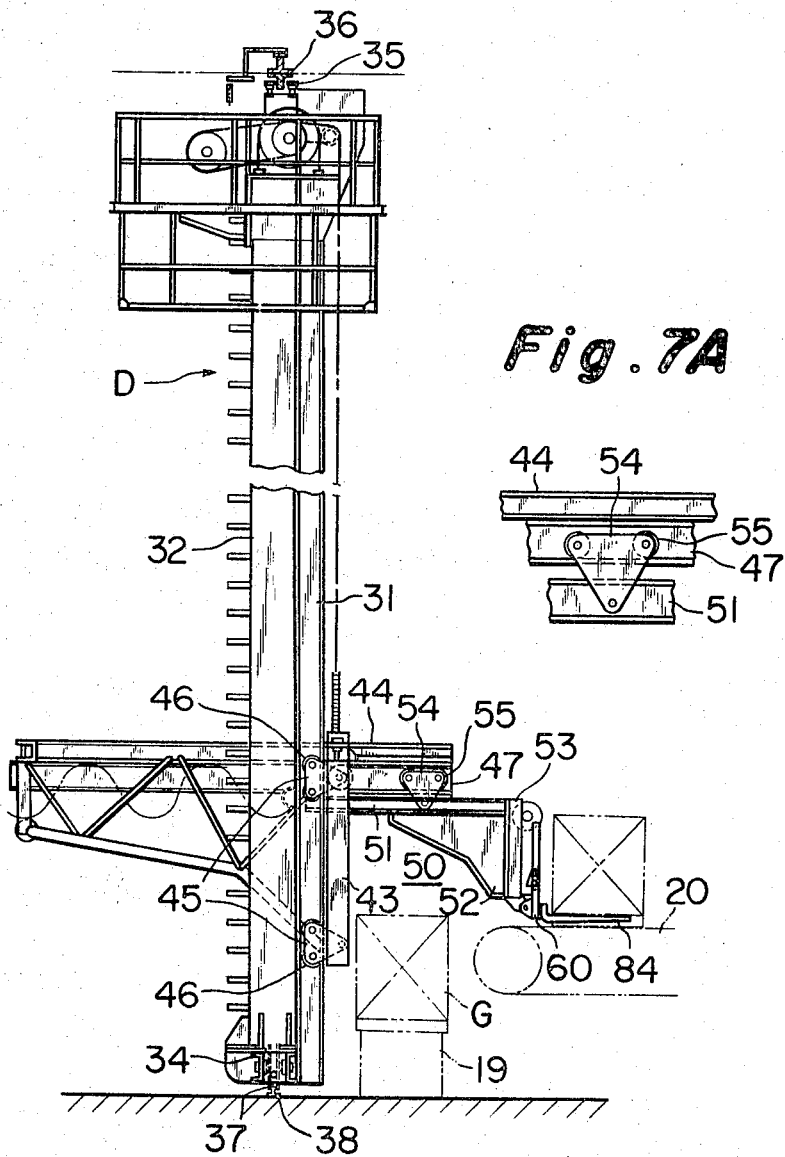

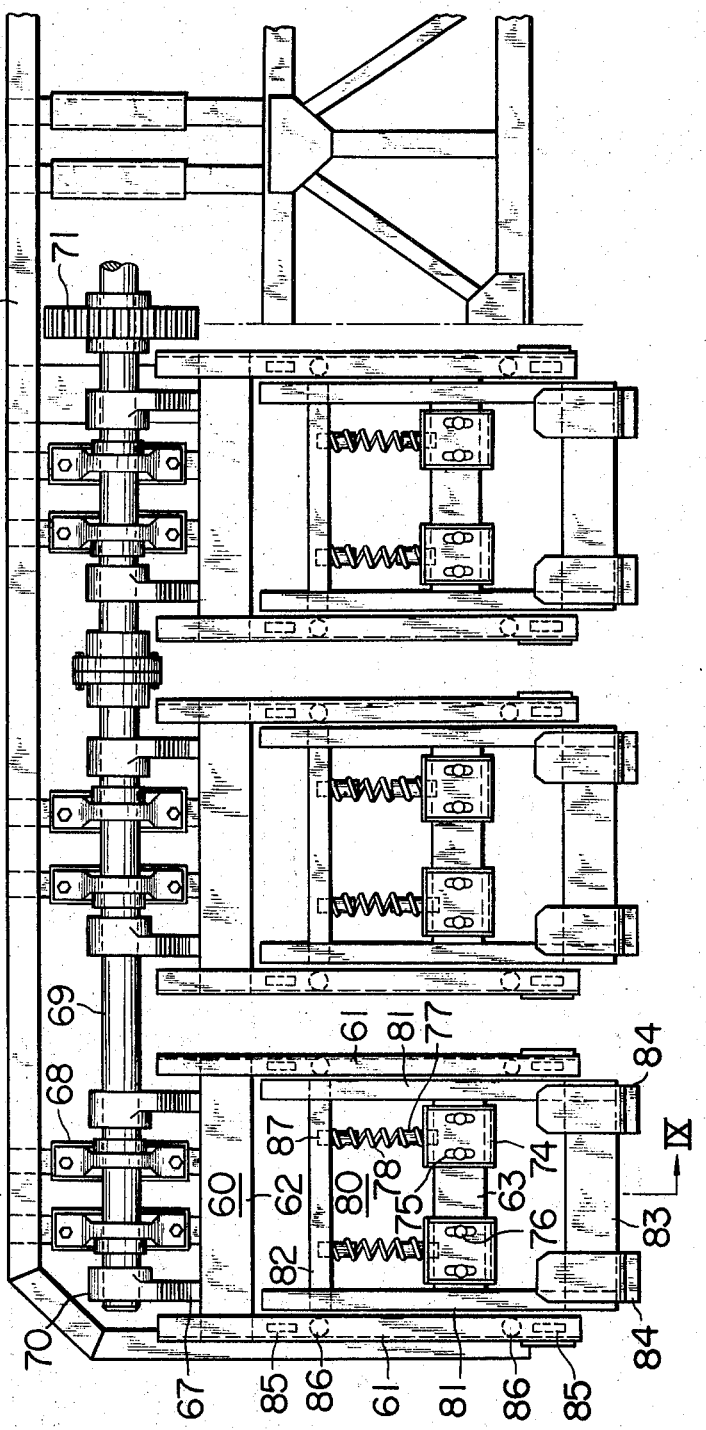

ARTICLE STORAGE AND HANDLING SYSTEM

FIELD OF THE INVENTION

The present invention relates to an automatic warehousing apparatus for placing into and carrying out of a warehouse a large quantity of objects. More particularly, it relates to an automatic warehousing system for automatically carrying into and out of a warehouse, employing warehousing conveyors, a plurality of piled-up fixed box-shaped objects mounted on a pallet, hereinafter called a pallet unit.

BACKGROUND OF THE INVENTION

Heretofore, a fork lift truck or an overhead travelling crane has been used for carrying box-shaped objects on a pallet into and out of a storage shelf in a warehouse. With the fork lift truck, the height of the storage shelf is limited because of the small elevating stroke of the fork. This makes it impossible to compose a vertically expanded storage shelf with high storing efficiency through the increase of height. Furthermore, the fork lift truck can carry only one pallet unit at a time. Therefore, when carrying a number of pallet units, a plurality of fork lift trucks must be operated to and fro, which requires a large floor space.

On the other hand, the overhead travelling crane requires considerable time and labor for slinging. The slinging operation at a high place is not only dangerous but also low in efficiency. Besides, it is difficult to determine a loading or unloading position. In addition, the building must be strong enough to withstand the self weight of the crane.

An object of the present invention is to provide an automatic warehouse which permits full-automatic warehousing and delivery of a large quantity of fixed box-shaped objects.

Another object of the invention is to provide a highly efficient automatic warehousing apparatus whereby a plurality of pallet units arranged in a row are simultaneously transversely carried into and out of a high storage shelf capable of accommodating a plurality of piled-up pallet units.

A further object of the invention is to provide a loading-and-unloading apparatus whereby pallet units, carried on a conveyor in a plurality of steps and rows, are collectively separated, from above to below, in the plurality of rows and loaded onto another conveyor or, otherwise, pallet units in the plurality of steps are collectively transferred to such other conveyor.

This invention is of use for the warehouses for such objects which are continuously mass-produced at a plant. which must be rapidly stored on pallets from one end of a warehousing apparatus and, then, rapidly loaded onto large shipping trucks from the other.

BRIEF DESCRIPTION OF THE DRAWINGS

FIG. 6 is a front view of the loading-and-unloading means.

FIG. 7 is a side elevation of the same.

FIG. 7A is an enlarged fragmentary view of a portion of FIG. 7.

FIG. 8 is a partially enlarged front view of the L-shaped frame.

DETAILED DESCRIPTION

Figure 1:
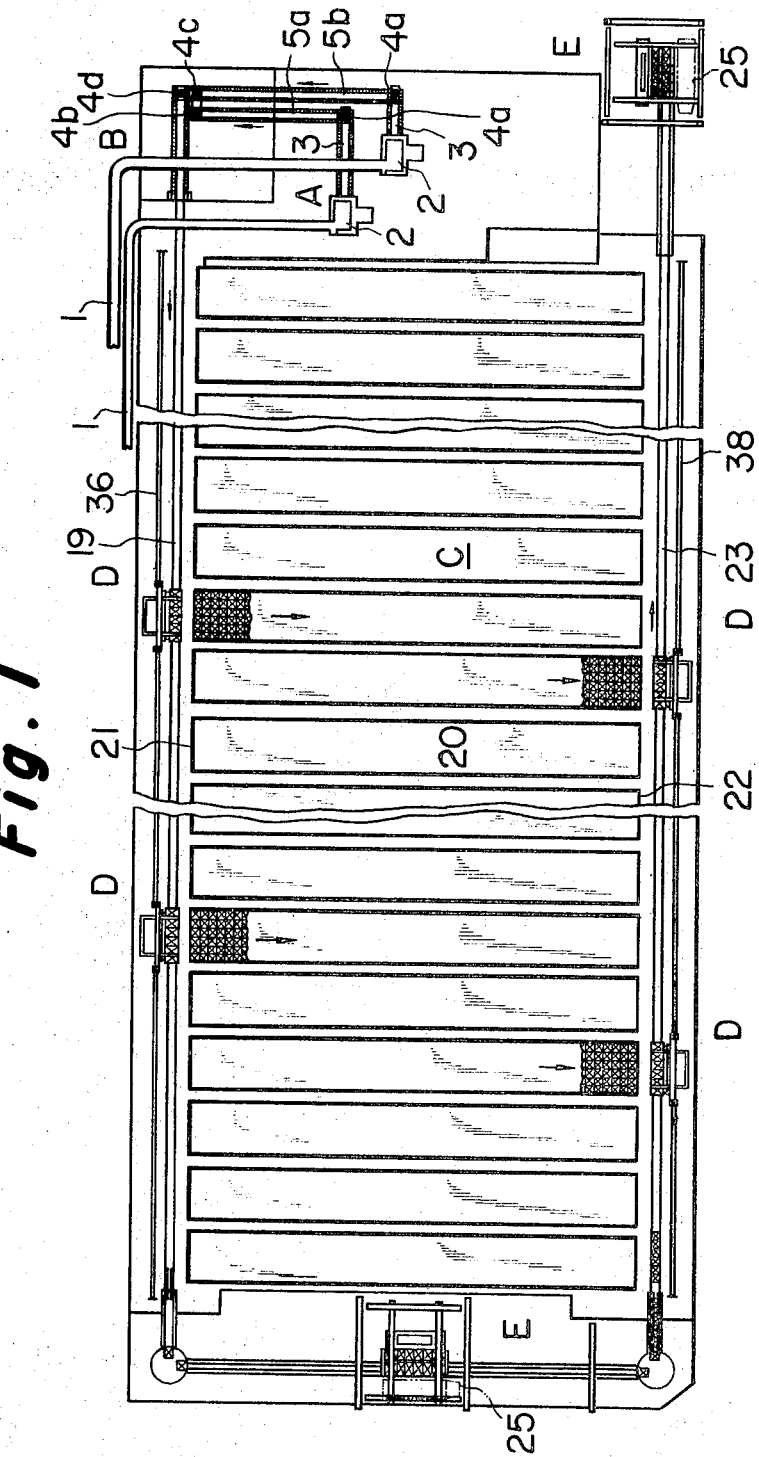
FIG. 1 is a plan view showing the entire arrangement of the automatic warehousing apparatus according to the present invention.

By a broad classification, an automatic warehousing apparatus of this invention consists of pallet unit supply means A, pallet unit arraying means B, warehousing means C, loading-and-unloading means D provided at the storing and delivery sides of said warehousing means C, a truck loader E, and conveyors provided between such means, which are diposed as shown in FIG. 1. By employing the combination of these means, a plurality of pallet units (six units in this embodiment) are carried into and out of said warehousing means C.

Fixed box-shaped objects carried by a conveyor from the production mill are piled on a pallet into a rectangular form consisting of a given number of objects by a pallet loader of the pallet unit supply means A, thereby forming a pallet unit. A given number of such pallet units are brought together and arrayed into a row or group by the arraying means B, and then said group is collectively loaded by the loading-and-unloading means D onto the storing end of the warehousing means C. Said warehousing means C comprises a number of slat conveyors, arranged in several steps vertically and in several parallel rows horizontally, whereby said group of pallet units is warehoused and stack-transferred to the delivery end at the opposite side. Another loading-and-unloading means D, provided at said delivery end, loads a warehoused group of units onto a delivery conveyor which transports same to the shipping yard where two groups, placed in two rows, are collectively loaded onto a truck by the truck loader E. In FIG. 1 the truck loader E is provided at both ends of the warehousing means C, but its location may be suitably selected elsewhere.

Figure 3:
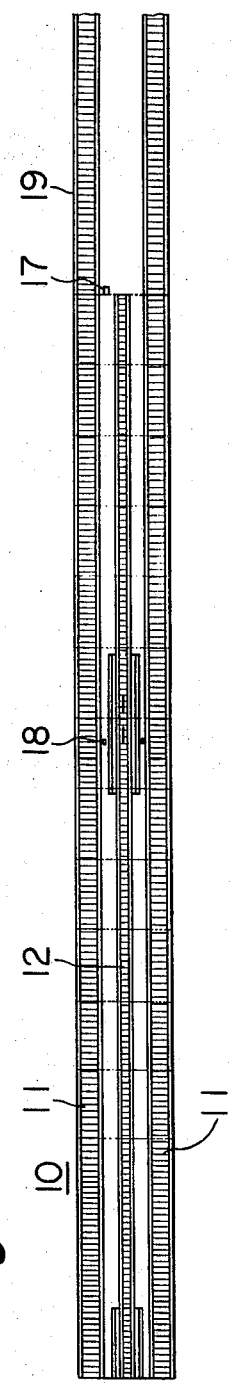
FIG. 3 is a plan view of the arraying means.
Figure 4:
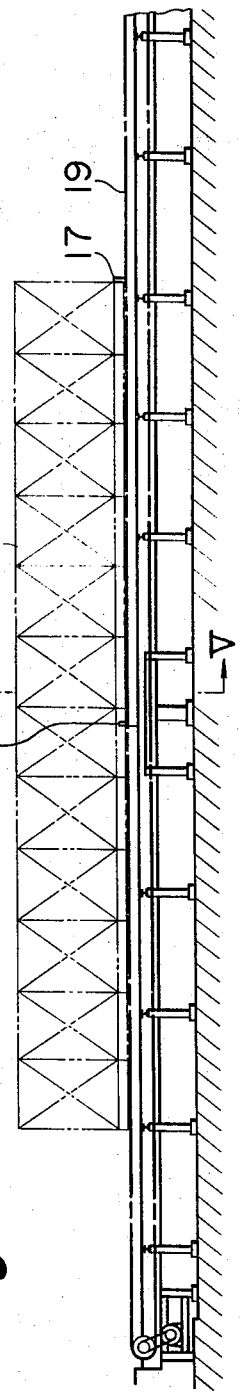
FIG. 4 is a front view of the same.
Figure 5:
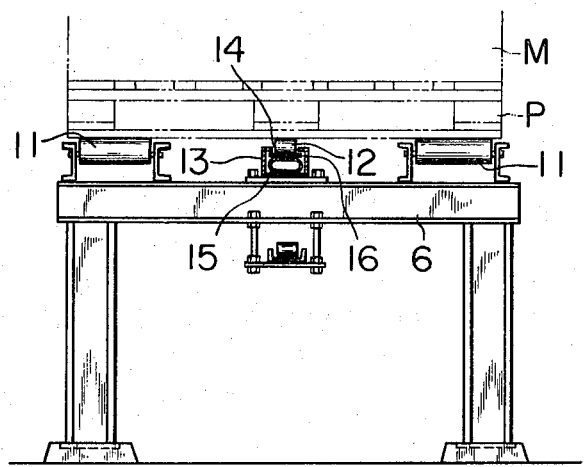
FIG. 5 is an enlarged cross section taken along the line V—V of FIG. 4.
Figure 5A:
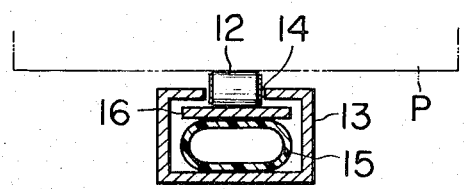
FIG. 5A is an enlarged fragmentary view of a portion of FIG. 5.

Here follows a detailed description of each unit A, B, C, D and E as briefly described above. Pallet unit supply means A:

In FIG. 1, fixed box-shaped objects carried from the production plant by two conveyors 1, 1 are loaded at pallet loaders 2, 2 onto a pallet P, thereby forming a pallet unit M (FIG. 4) of a rectangular shape, which is then transferred to accumulation conveyors 5a, 5b through accumulation conveyors 3, 3 and transfer means 4a, 4a. The pallet unit M on the accumulation conveyor 5a is transferred to the accumulation conveyor 5b by transfer means 4b, 4c, and the pallet unit M on the accumulation conveyor 5b is supplied to the arraying means B by transfer means 4d. Detailed description will not be given as to said pallet loaders 2 and transfer means 4a through 4d, since they are of known construction. Arraying means B:

As illustrated in FIGS. 3 and 5, the arraying means B consists of an arraying conveyor 10 connected to said transfer means 4d and stop to be described later.

The arraying conveyor 10 has a row of free rollers 11 on both sides and an endless chain 12 at the center, extending over its full length. The chain 12 is a kind of block chain with a flat upper surface, and running in an upper opening 14 of a trough-like metal receptacle 13 mounted on a frame 6 along the longitudinal direction of the conveyor and supported by the upper surface of a duct hose 15 provided in said metal receptacle 13 with a rail 16 therebetween. When compressed air is fed from outside, said duct hose 15 increases its cross-sectional area to press the chain 12 against the pallet P, and the pallet unit M is sent forward by the frictional force produced thereby.

The arraying conveyor 10 is provided with a mechanical stop 17 at the front end to stop the front end of the pallet P, and another mechanical stop 18 at some distance therebehind. Said stops 17 and 18 independently receive external signals and are moved above and below the carrying surface of the conveyor 10 by air-cylinders or other means. The distance between the two stops 17 and 18 is fixed so as to permit arraying of a given number (six in this embodiment) of pallet units M in contact with each other. When the stops 17 and 18 are projected, the pallet P, even if pressed by said chain 12, slips on the chain 12 and is thereby stopped.

Figure 2:
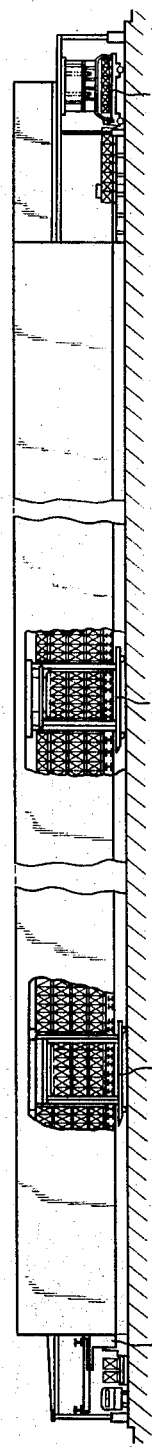
FIG. 2 is a front view, with a part of the building cut open.

When the first pallet unit M has been transferred by the transfer means 4d onto the arraying conveyor 10, the stop 17 is elevated while the stop 18 is lowered. Therefore, said pallet unit M is stopped by the stop 17, and the subsequent five pallet units M, each contacting the preceding pallet unit, are also successively stopped. When the six pallet units M have thus passed over the stop 18, said stop 18 rises to hold the advance of the following pallet unit M. At the same time, the stop 17 lowers to send the combined six pallet units M, forming a group G, onto a storing conveyor 19. On completion of sending, the stop 17 rises again and the stop 18 descends again to repeat the formation of said group G. Thus each six pallet units M are combined in a row to form a group G, and group is then supplied to the storing conveyor 19. Warehousing means C:

As shown in FIGS. 1 and 2, the warehousing means C comprises a number of slat conveyors 20 arranged in parallel and extending from the lateral side of said storing conveyor 19 in a direction at right angles thereto. Each slat conveyor 20 is wide enough to carry the group G crosswise thereon. In the illustrated embodiment, the groups G are stacked four high on the conveyor 20 and are stack-transferred from the storing end 21 to the delivery end 22. Therefore the objects loaded on the slat conveyors are stored thereon until they are carried out from the delivery end 22. In this embodiment, each slat conveyor can carry a maximum of 888 pallet units M. The slat conveyor 20 may be in two steps, that is, one above the other, thereby duplicating its object storing capacity. Loading-and-unloading means D:

Loading-and-unloading means D of the same design are provided at the storing and delivery end of the warehousing means C, and each is permitted to run along the storing conveyor 19 and the delivery conveyor 23, respectively.

FIGS. 6 through 9 illustrate details of an embodiment of said loading-and-unloading means D. A main frame 30 consists of a pair of vertical columns 32, each being attached with an I-shaped rail 31 at the front side, and horizontally disposed upper and lower beams 33 and 34, which are fixed into a square form. The upper beam 33 is guided by a fixed ceiling rail 36 by means of pairs of horizontal rollers 35 axially attached to the upper portion of said beam 33 at both ends. The lower beam 34 is capable of running on a fixed floor rail 38, from right to left or vice versa in FIG. 6, by means of a pair of wheels 37 axially attached to both ends thereof.

An elevating frame 40 consists of upper and lower horizontal beams 41 and 42, running in parallel with said upper and lower beams 33 and 34, a guide frame 43 sliding over the front side of said I-shaped rail 31, and a pair of horizontal beams 44 extending forward and backward from said beam 41. Two each upper and lower brackets 45 are oppositely attached to said guide frame 43, and guide rollers 46 axially attached thereto contact the rear surface of the front flange of said I-shaped rail 31 and thereby support the guide frame 43 while keeping it free to slide vertically along said vertical column 32.

An elevation drive mechanism for said elevating frame 40 consists of two pairs of rotatable sheaves or pulleys $c1$ and $e1$ and $c2$ and $e2$, axially supported by brackets 48 fixed at both ends of the lower side of said horizontal beam 41 of the elevating frame 40; a pair of rotary sheaves $a1$ and $a2$ axially supported at one end of said upper beam 33 of the main frame 30; a pair of three each rotary sheaves $b1$, $d1$, and $f1$ and $b2$, $d2$, and $f2$ axially supported by said upper beam 33 approximately above said sheaves $c1$ and $e1$ and $c2$ and $e2$, respectively; a pair of rotary tension sheaves $t1$ and $t2$ also axially supported by said upper beam 33; and electrically operated rotary cable drum Dm fitted to said vertical column 32; and a pair of wire ropes or cables $w1$ and $w2$ whose one end is attached to said drum and the other end is fixed to a fastening device K fitted at the center of the lower side of said upper beam 33.

The wire rope $w1$ extends from said drum Dm and is retained by sheaves $a1$, $b1$, $c1$, $d1$, $e1$, $f1$ and $t1$, and is then fixed to said fastening device K. The wire rope $w2$ also extends from said drum Dm and is retained by sheaves $a2$, $b2$, $c2$, $d2$, $e2$, $f2$, and $t2$, and is then fixed to the fastening device K. Therefore, by turning the drum Dm in one direction or the other, the elevating frame 40 is caused to ascend or descend along said vertical columns 32.

A parallel rail 47 is attached below the beam 44 of said elevating frame 40, and a L-shaped frame 50 is suspended therefrom so as to run forward and backward. Said L-shaped frame 50 consists of a horizontal frame 51 and a vertical frame 53 firmly fixed to the front end thereof by a supporting member 52, and is suspended from the rail 47 by means of two pairs of rollers 55 which are axially supported by brackets 54 attached to both sides of said horizontal frame 51. Gears 57 are fixed to both ends of a rotating shaft 56 horizontally mounted on said horizontal frame 51, and are engaged with racks 58 which are fixed to and extend along the rails 47. By driving said shaft 56 by an electric motor, not shown, through a reduction gear unit 59, said L-shaped frame 50 is caused to run forward and backward on said rails 47.

On the front of said vertical frame 53 are supported a plurality of tilting frames 60, equivalent to the number of pallet units M to be handled at a time (six in this embodiment), at intervals equal to the length of the pallet P. As detailed in FIGS. 8 and 9, each tilting frame 60 comprises a pair of vertical columns 61, made of channel steel, and a pair of upper and lower beams 62 and 63, which are fixed into a square form. A pair of brackets 64 projecting rearwardly from the lower end of said vertical columns 61 and brackets 64 projecting forwardly from the lower portion of said vertical frame 53 are pivotally fitted together by a pin 66. A pair of gear segments 67 (having an axis substantially at the pivot pin 66) are fixed to said horizontal beam 62, while a horizontal driving shaft 69 is rotatably supported by bearings 68 fitted to said vertical frame 53. Quadrant pinions 70, adapted to engage with said gear segments 67, and gears 71 are keyed to said shaft 69. When an electric motor 72 mounted on said vertical frame 53 rotates said driving shaft 69 through gears 71 and 73, said tilting frames 60 tilt forward or backward about said pin 66 while supporting said pallet units M on a fork 84 to be described later. The frames 60 are maintained in the tilted position when said electrical motor 72 stops. This tilting motion is for smooth insertion and detachment of the fork into and from said pallet P as well as for stabilization of objects on said fork.

A fork frame 80 comprises a pair of vertical members 81 and upper and lower horizontal members 82 and 83, which are squarely fixed together. The width of the fork frame 80 is smaller than the inside width of the tilting frames 60, and a pair of forks 84 are fixed to said horizontal member 83. A pair of rollers 85 and 86 are axially supported at the upper and lower portion of the outside of both vertical members 81, with the rollers 85 contacting the inside of the channel flange of the vertical columns 61 of said tilting frame 60 and the rollers 86 contacting the web of said channel. By this means, the fork frame 80 is guided and supported by the tilting frame 60 and thereby permitted to slide upward and downward.

A pair of brackets 74 are fixed to the horizontal beam 63 of said tilting frame 60 so that their vertical position may be adjusted by moving bolts 76 in slots 75. By attaching both ends of a compression spring 78 to a rod 77 vertically fixed to said bracket 74 and a rod 87 fixed to the horizontal beam 82 of said fork frame 80, the fork frame 80 is resiliently supported by the tilting frame 60. This not only relieves the shock from the load carried by the fork 84, but also facilitates insertion of said fork into the pallet P. A stop 89 is fixed to the vertical member 81 and contacts the upper surface of the horizontal beam 63 of said tilting frame 60 for controling the lower limit of the fork frame 80 under the loaded condition.

In FIG. 7, it is assumed that the group G is stopped before a desired slat conveyor 20, having been transferred by the conveyor 19 in a direction perpendicular to the plane of drawing. The loading-and-unloading means D also is stopped before said desired slat conveyor 20. At this time, the height of the elevating frame 40 must be adjusted or the L-shaped frame withdrawn so that the fork 84 does not touch the group G. Then the loading-and-unloading means D transfers the group G from the conveyor 19 onto the slat conveyor 20 in the following sequence:

1. On withdrawing the L-shaped frame 50 and adjusting the height of the elevating frame 40, the tip of the fork 84 is brought to the fork insertion opening of each pallet of the group G. Then, after confirming that the conveyor 19 and the slat conveyor 20 are at a standstill and that the storing end of the slat conveyor 20 is not filled with the preceding group G, said L-shaped frame 50 is moved forward to insert the fork 84 into the pallet P. At this time the tip of the fork 84, being not yet loaded, inclines somewhat upward, so it must be lowered by slightly tilting said tilting frame 60 forward. Since the fork frame 80 is free to move vertically by the action of said spring 78, the fork 84 can be readily inserted into the pallet P even if the height of each palllet in the group G is uneven.

2. By raising the tip of the fork 84 a little by tilting said tilting frame 60 backward and simultaneously elevating said elevating frame 40, each fork frame 80 descends, under the influence of the load carried thereby, to the predetermined lowest position fixed by the stop 89, whereby individual pallet units M are held at the same level on said fork.

3. Then the L-shaped frame 50 and the elevating frame 40 withdraws and ascends further, respectively. The group G is thus raised to a position above the level of the slat conveyor or above the previously piled up group(s), exercising care so that the group G does not hit on the support of said slat conveyor 20, etc.

4. On confirming that the storing end 21 of the slat conveyor 20 has space to accommodate the group G and that said slat conveyor is at a standstill, said L-shaped frame 50 advances to transfer the group G over the slat conveyor 20 and stops.

5. Then the elevating frame 40 descends to place the group G on the slat conveyor 20 or the previously stored group(s), and stops. After this, the tilting frame 60 slightly tilts forward and the L-shaped frame 50 moves back to withdraw said fork 84 from the pallet P, thereby completing the storing of the group G.

In the above sequence of operation, selection of the storing slat conveyor 20 and the position of the elevating frame 40 and operation of the L-shaped frame 50 and the tilting frame 60 are automatically done by electric control means. Details of said control means will not be described here, since it may be composed of known electric circuitry including such ordinary units as limit switches and relays.

The loading-and-unloading means D provided at the delivery end of the warehousing means C transfers the groups, one by one, from said delivery end 22 onto the delivery conveyor 23. This transfer operation is performed following the approximately reversed sequence of above storing operations (1) through (5), so no further detailed description will be given.

The group G transferred on the delivery conveyor 23 is thereby sent to the shipping yard.

Figure 9:
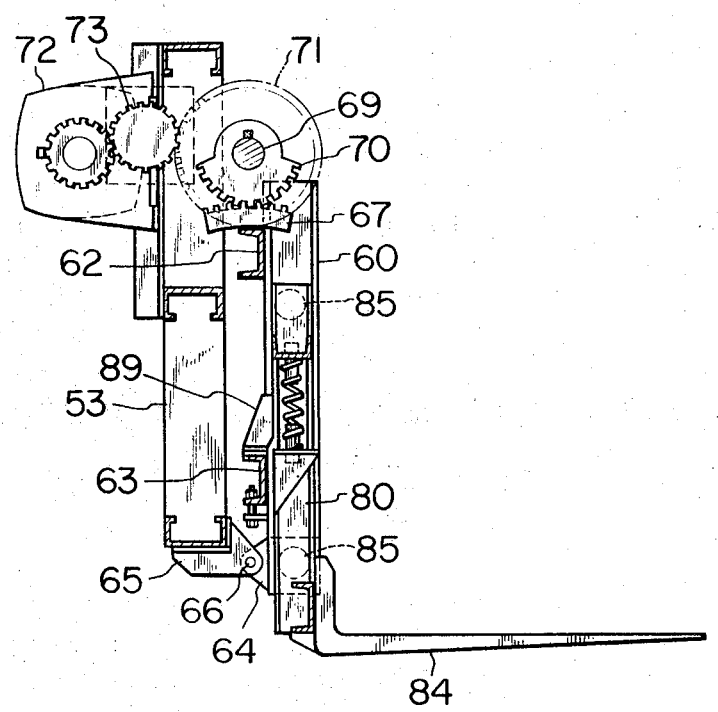
FIG. 9 is a cross section taken along the line IX—IX of FIG. 8.
Figure 10:
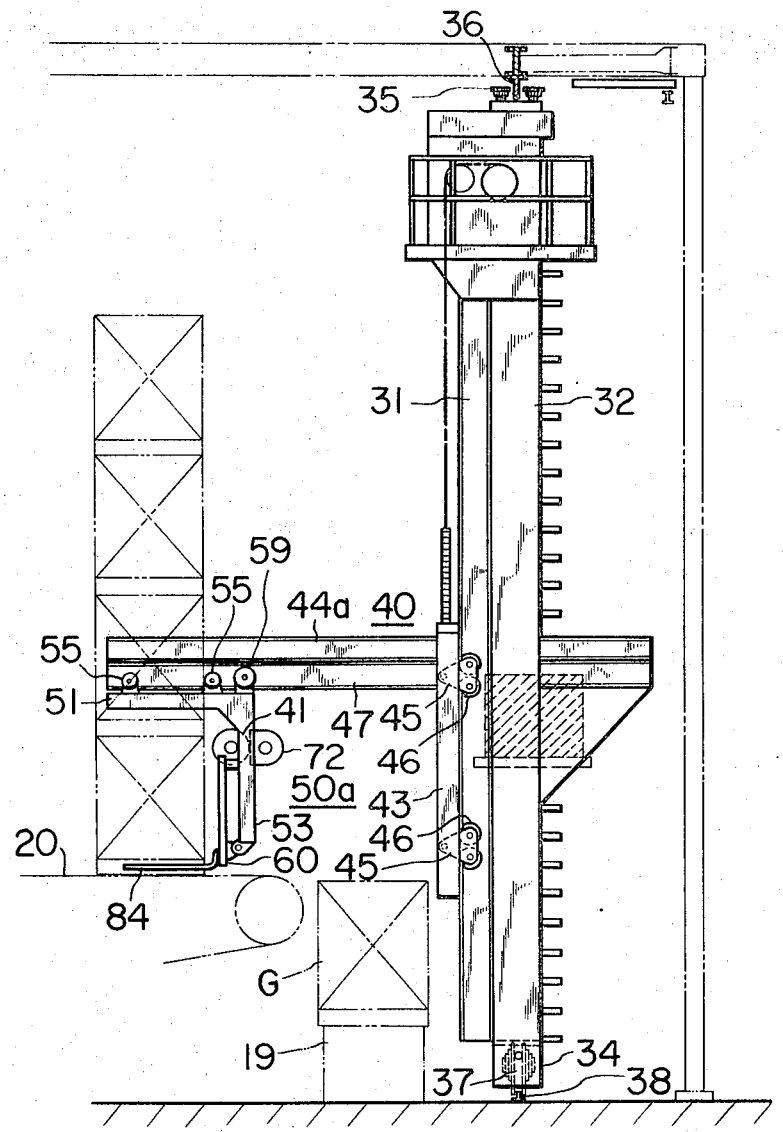
FIG. 10 is a side view of another embodiment of the loading-and-unloading means, similar to FIG. 7.

FIG. 10 is a side elevation of another embodiment of the loading-and-unloading means D. In this means D, an L-shaped frame 50a is formed by fixing a vertical frame 53 to the rear end of the horizontal frame 51, instead of the front end thereof as illustrated in FIG. 7. Other construction and action are approximately the same as those shown in FIGS. 6 through 9, and therefore similar parts will be designated by similar reference characters. According to this embodiment, a beam 44a is located ahead of the beam 44 shown in FIG. 7, approximately by the width of the pallet P, and the length of the portion of the beam 44a protruding behind the vertical column 32 is reduced as compared with FIG. 8, resulting in the reduction of the space required behind said vertical column 32. Truck loader E:

The truck loader E (FIGS. 11–13) consists of a traverser T connected to the delivery conveyor 23 and a crane F provided at one side thereof.

Figure 12:
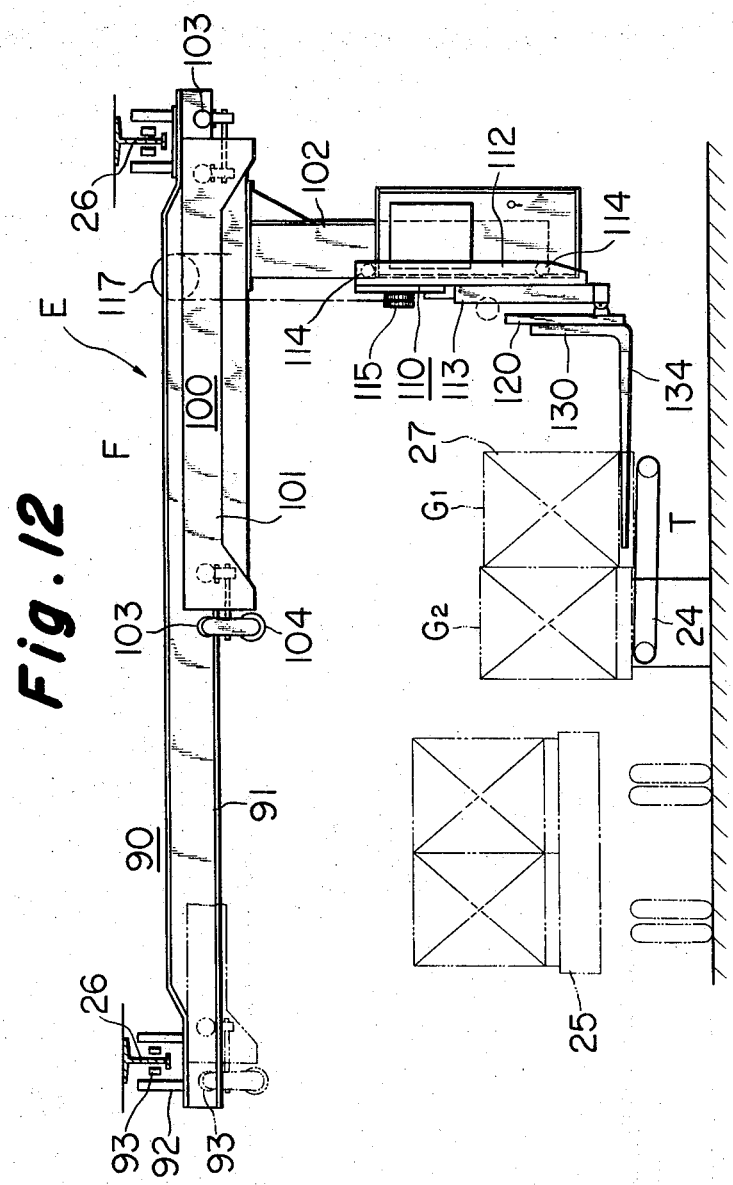
FIGS. 12 and 13 are a side elevation and a front view of the same, respectively.

Said traverser T consists of a live roller conveyor 28 connected to the discharge end of said delivery conveyor 23 and a chain conveyor 24 extending between the live rollers, from one side of said live roller conveyor 28 toward said crane F, through a distance about twice the width of said conveyor 28 (FIG. 12). This chain conveyor 24 is made up of six pairs of chains supported by a common frame with each pair individually supporting each pallet P of the group G. By pivotally supporting one end of said frame on a fixed table or support, using a horizontal hinge pin, and vertically moving the other end (rightward end of conveyor 24 in FIG. 12) thereof by an air cylinder (not shown), the carrying surface of the chain conveyor 24 may be moved above and below the carrying surface of the live roller conveyor 28.

When the chain conveyor 24 is in the lowered position, a first group G1 transferred from the delivery conveyor 23 to the traverser T reaches a predetermined position on said conveyor 28 and the roller conveyor 28 is then stopped by a stop (not shown). Then the rightward end of said chain conveyor 24 is moved upwardly by the air cylinder (not shown) to engage and support the group G1, conveyor 24 then moves group G1 laterally (rightwardly in FIG. 12) toward the side of the live roller conveyor 28 and stops, thereby permitting a second group G2 to reach said predetermined position on conveyor 28. Therefore, two groups G1 and G2 remain at a standstill on the traverser T, in laterally contacted two rows as illustrated in FIG. 12.

Figure 11:
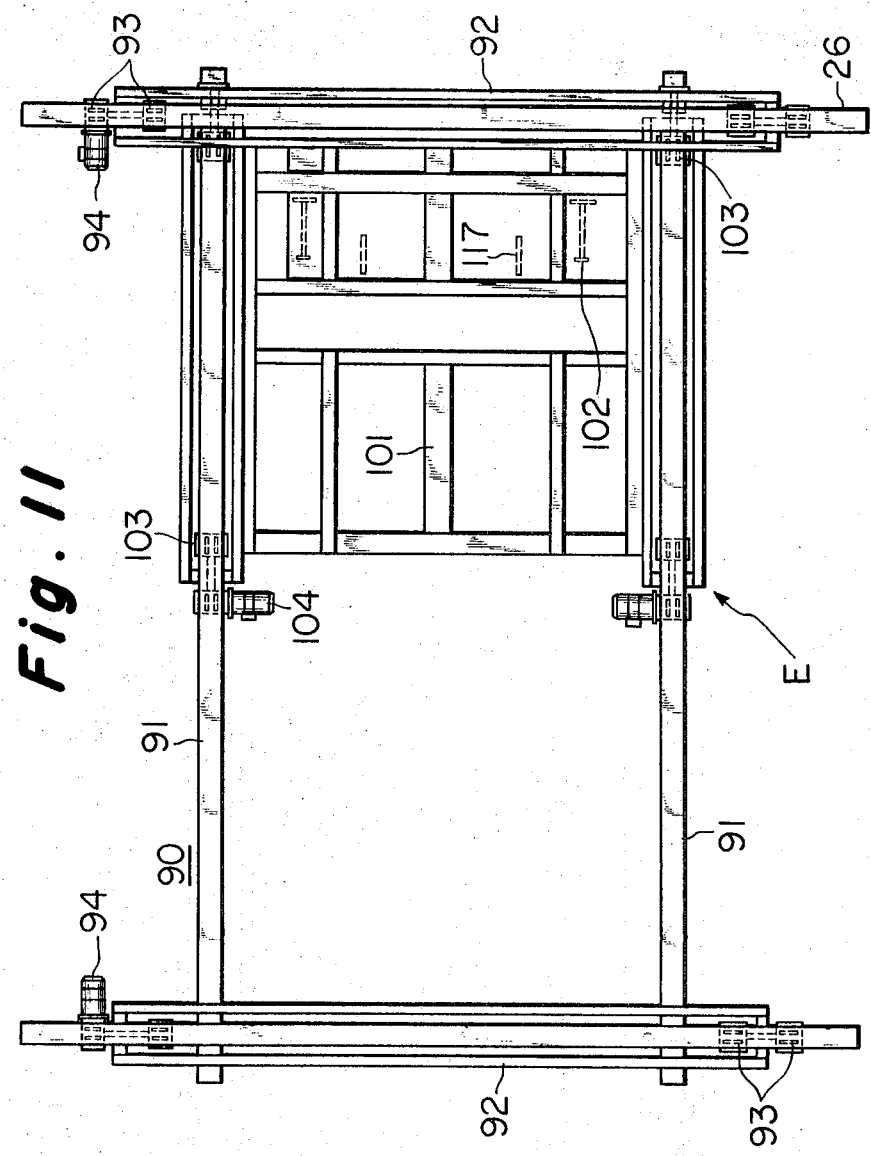
FIG. 11 is a plan view of the crane for the truck loader.
Figure 13:
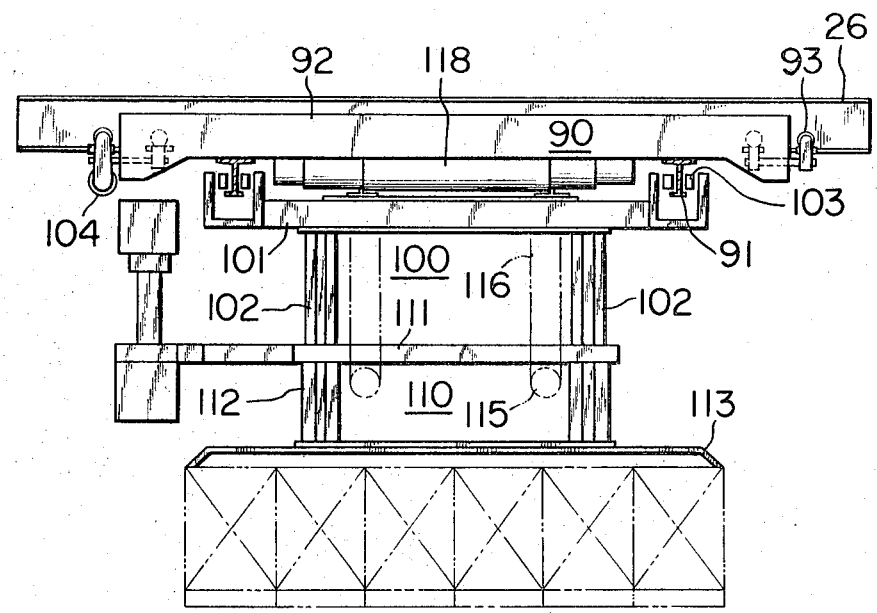

The crane F collectively loads said two rows of groups G1 and G2 onto the loading platform 25 of a truck, and details of which will be described by reference to FIGS. 11 through 13.

A traversing frame 90 consists of a pair of beams 91, serving as the travelling rails, and a pair of horizontal members 92 at the front and rear ends thereof, which are fixed into a square form. Said frame 90 is supported on parallel stationary traversing rails 26 by means of two pairs each of traversing wheels 93 axially supported at both ends of said horizontal members 92. A traversing motor 94 permits the frame 90 to travel along the rails 26 in the transferring direction of said live roller conveyor 28.

A running frame 100 consists of a square-shaped horizontal frame 101 and a pair of vertical frames 102, which are made of I beams and fixed at a position behind and under said horizontal frame 101. Said running frame 100 is supported from the rail surface of the beams 91 of said traversing frame 90 by means of two pairs each of running wheels 103 axially supported at the four corners of said horizontal frame 101, and is permitted to run forward and backward by a running motor 104.

The vertical frame 102 has an elevating frame 110 attached thereto. Said elevating frame 110 is made by fixedly fitting together an upper horizontal beam 111 and a pair of guide frames 112 which slide along the front of said vertical frames 102, and by fixing a vertical supporting frame 113 to the front surface of said guide frames 112. A pair of brackets are oppositely fixed at the upper and lower portions behind said guide frames 112, and a guide roller 114 is axially supported by each bracket. By bringing said guide rollers 114 into contact with the inside of the front flange of said vertical frames 102, the elevating frame 110 is guided and supported so that it can move vertically along the vertical frames 102.

A pair of sheaves 115 are axially supported by the upper beam 111, and one of a pair of cables wire 116, one end of which is fastened to said horizontal frame 101, is passed around each sheave 115 and around another sheave 117 mounted on the horizontal frame 101, with the other end of said cable being connected to an electrically operated rotary cable drum 118 mounted on the frame 100. By this drum, the elevating frame 110 is moved upward and downward.

In front of said supporting frame 113 there is provided a tilting frame 120 and a fork frame 130, each having a similar construction to that shown in FIGS. 8 and 9, except that a fork 134 has such a length as is enough to pass through the pallets of two adjacent rows of groups G.

The truck loader E of the above-described construction loads two rows of groups G onto the loading platform 25 of a truck, following the sequence described below:

1. When, as described before, a first group G1 automatically stops at the above-mentioned predetermined position on the conveyor 28, the fork 134 is withdrawn to such position that its tip is just in front of the fork insertion opening of each pallet of said group G1 (FIG. 12). On confirming that the fork 134 is in said withdrawn position, the air cylinder operates to elevate the supporting frame of the chain conveyor 24 and, at the same time, to start said chain conveyor 24. By this elevating motion, said first group G1 is supported on the chain conveyor 24 and traversed to a position 27 outside the live roller conveyor 28, as illustrated in FIG. 12. By this traversing movement of the group G1, the fork 134, remaining at a standstill, is passed into the fork insertion opening of each pallet. The chain conveyor 24 stops when said first group G1 has been traversed completely outside the live roller conveyor 28, at which time the front half portion of the fork 134 still remains in each pallet P of group G1.

2. On stopping, the chain conveyor 24 is automatically lowered by the air cylinder, whereby the total load of the group G1 is transferred from the chain conveyor 24 to the front tip of the fork 134. The impact caused by this load transferring on said fork 134 is absorbed by the springs 78 (FIG. 8) which resiliently support the fork frame 130 on the tilting frame 120.

3. When the chain conveyor 24 completes its descending motion, a second group G2 is transferred on the live roller conveyor 28 and stops beside said first group G1, as described before and as shown in FIG. 12.

4. The air cylinder operates again to elevate the chain conveyor 24, whereby said first group G1 is raised apart from the tip of the fork 134 and supported at the same level as said second group G2.

5. The running frame 100 of the crane F is driven by motor 104 and advances (leftwardly in FIG. 12) to insert the front portion of said fork 134 into the pallets of said second group G2. By this means, the fork 134 is passed through the whole pallets of the first and second groups.

6. The tilting frame 120 is slightly tilted backward to raise the tip of the fork 134 a little. At the same time, the elevating frame 110 is raised by cable drum 118 and the running frame 100 is advanced until the groups G1 and G2 reach a predetermined position over the loading platform 25 of the truck, whereupon said elevating frame 110 and running frame 100 automatically stop. Then, if necessary, the traversing frame 90 is moved sidewise along rails 26 to adjust the loading position over said platform 25 in the longitudinal direction of the truck. Then the elevating frame 110 is lowered to place said groups G1 and G2 onto the loading platform 25.

7. The tilting frame 120 is then tilted forward, the running frame 100 is withdrawn to draw out the fork 134 from the pallets, and the crane F is returned to the original stand-by position, thus completing a whole cycle of truck loading.

As described above, the present invention makes it possible to combine a plurality of independent pallet units M into a row of group G, which is collectively delivered into and out of the warehousing means C by the loading-and-unloading means D. Furthermore, two such groups are simultaneously loaded on a truck. This permits a full automatic delivery of fixed box-shaped objects into and out of a warehouse at an extremely high efficiency, thereby making itself suitable as a warehousing facility for large quantities of objects.

The possibility of providing two or more stacked warehousing means reduces the area of a shipping yard, thus permitting effective utilization of a warehouse site.

The warehousing means, comprising a number of conveyors, serves a dual purpose of storing and transferring from the storing end to the delivery end. Therefore it may be placed in the flow of objects between the production plant and the shipping yard, thereby performing the warehousing and delivery of objects in a very reasonable manner.

The embodiments of the invention in which an exclusive property or privilege is claimed are defined as follows:

1. A mass-handling automatic warehousing apparatus which comprises pallet unit supply means for piling and transferring fixed box-shaped objects on a pallet, arraying means connected to said pallet unit supply means for arranging a given plurality of said pallet units into a lined-up group, warehousing means comprising parallel-disposed conveyors transversely carrying said group, a warehousing conveyor disposed along the feeding end of said warehousing means and connected to said arraying means, a shipping conveyor disposed along the shipping end of said warehousing means, loading-and-unloading means running along said warehousing and shipping conveyors for transferring said group from said warehousing conveyor to said warehousing means or from said warehousing means to said shipping conveyor, and a truck loader including a traverser connected to said shipping conveyor and a crane for collectively transferring two each of said groups.

2. Loading-and-unloading means comprising a main frame, an elevating frame guided and supported by said main frame, an L-shaped frame comprising a horizontal frame mounted on said elevating frame and moving forward and backward and a vertical frame attached to the front or rear end of said horizontal frame, a plurality of tilting frames supported, in a row, by the front portion of said vertical frame and adapted to tilt forward and backward on the fulcrum at its lower end, and a fork frame elevatingly guided and supported by said tilting frames, having a fork at its lower end, and springingly fitted to said tilting frames through a spring.

3. Loading-and-unloading means in accordance with claim 2, in which a plurality of pinions are fixed to a driving shaft attached to said vertical frame, said pinions are brought into engagement with a sector gear fixed to the upper portion of each tilting frame, and the lower limit position of said fork frames with respect to said tilting frames is controlled to the same level by means of a stop.

* * * * *